United States Patent Office 2,871,703
Patented Feb. 3, 1959

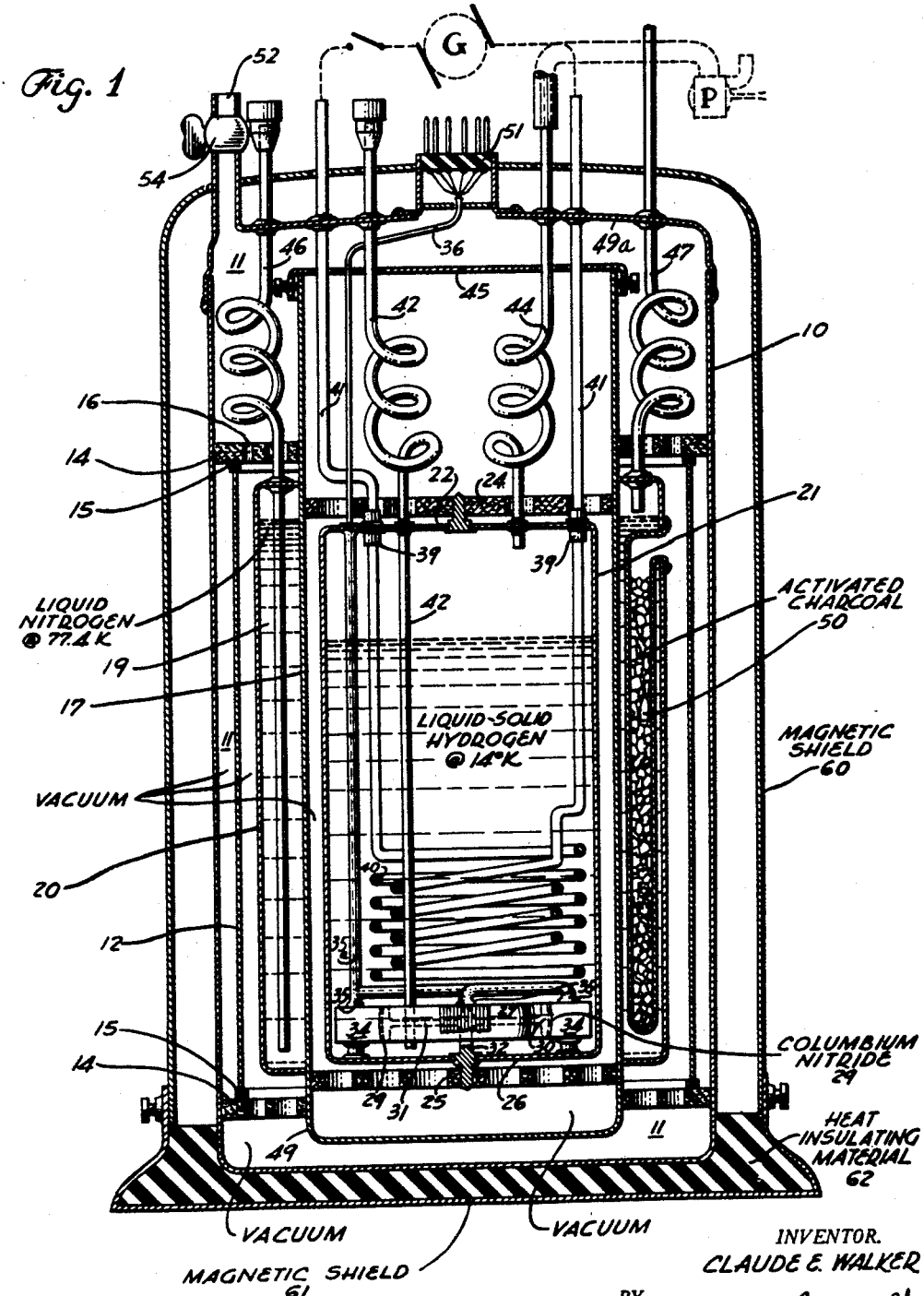

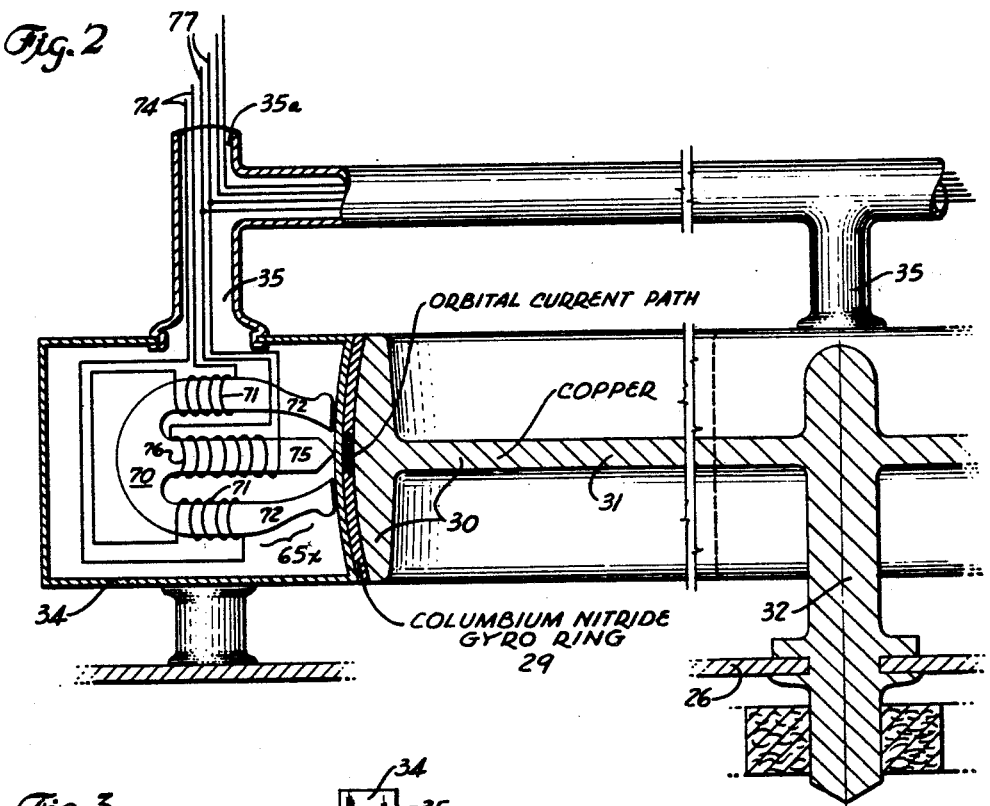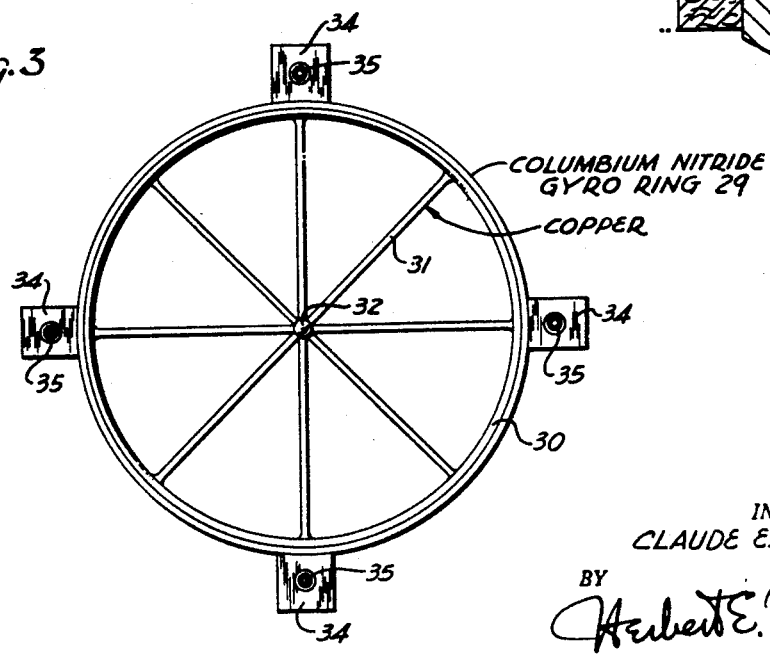

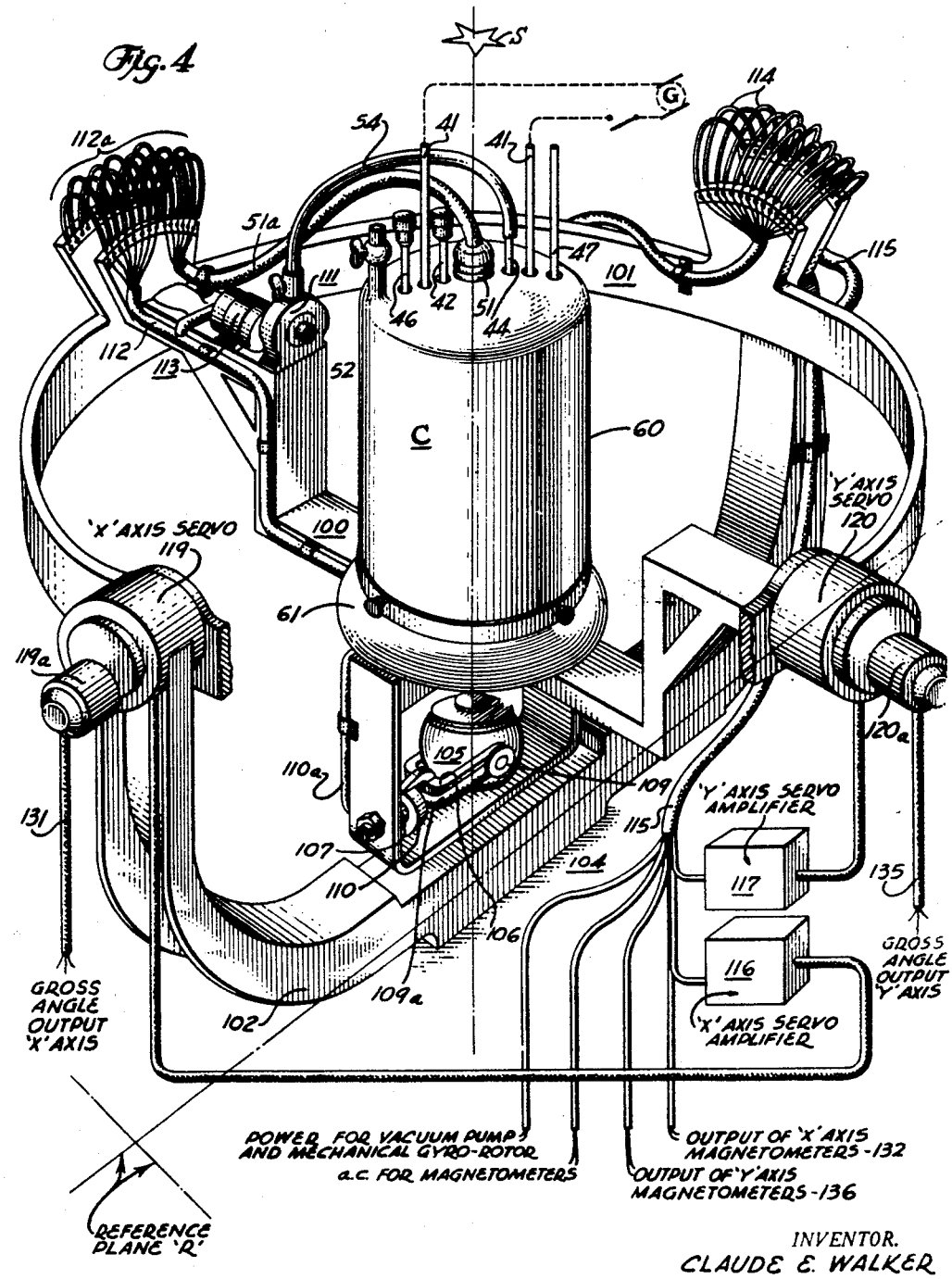

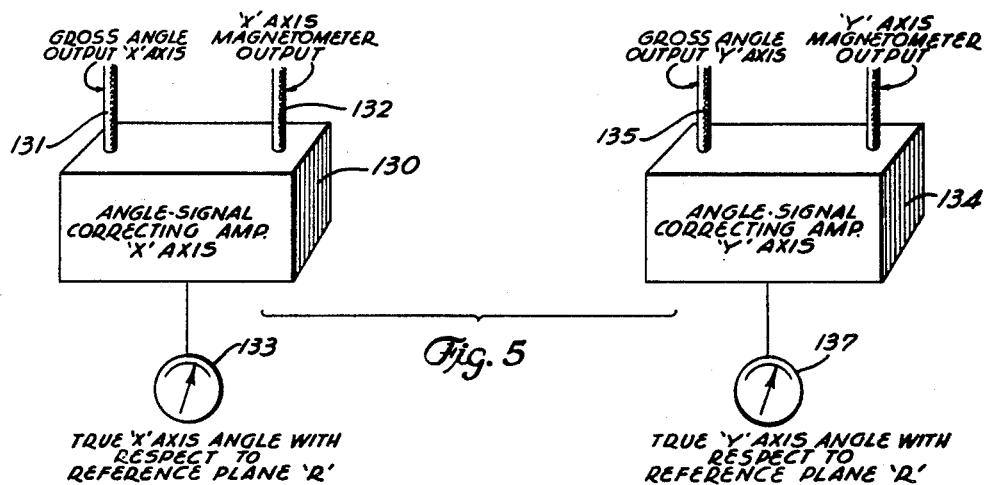

2,871,703
GYRO

Claude E. Walker, Inglewood, Calif., assignor to Northrop Aircraft, Inc., Hawthorne, Calif., a corporation of California Application November 13, 1948, Serial No. 59,876

5 Claims. (Cl. 74—5.6)

My invention relates to a means and method for maintaining a position in inertial space and relates more particularly to a device having unique gyrostatic properties, which I desire to term an electron gyro.

The term electron gyro as used herein is used only in its strict derivative sense, i. e., to designate a rotating electron ring of uniform electron density. This term is not used herein in any sense as limiting the device of the present invention to the accomplishment of the identical functions of the mechanical device commonly known as a gyroscope. While the mechanical gyroscope and the electron gyro of the present invention have many common characteristics, in many respects they are quite different, as will be readily seen from a perusal of the ensuing specification.

A gyroscope, as presently known, comprises a relatively heavy wheel or disc shaped rotor mounted to spin rapidly about an axis, and free to rotate about one or both of two axes perpendicular to each other and to the axis of spin. The spinning gyro offers considerable resistance, depending upon the angular momentum of the device, to any torque which would tend to change the axis of spin. Such prior known devices will be herein referred to as mechanical gyros.

Presently known free gyros of the mechanical type are often used to maintain a prescribed position in space, supposedly wholly independent of the motion of the bases upon which they are mounted, so that a vehicle can be navigated or otherwise directed over a predetermined course. The various bearings, power feeds and gimbal rings are arranged so that effectively the spinning rotor will be pivoted freely about a single point. Pickoff devices are usually mounted to measure deviations of the base or vehicle axis from the direction of the mechanical gyro axis.

However, mechanical gyros will maintain a fixed axial direction in space only if there are no displacement torques exerted on the rotor. In practice all mechanical gyros have position drifts due to various spurious torques imparted to the rotor by imperfections in the mechanism. First of all, torques may be exerted through the bearings because of their friction; secondly, any unbalances in the rotor or gimbal rings, or shifts in position, will produce torques whenever accelerations, including that of gravity, are experienced. In air driven rotors there may also be spurious torques caused by stray air currents. The drift rates under accelerations present in present aircraft gyros range from 0.5 to 5 degrees per hour with very few attaining the lower value, especially in flight.

The solution of excessive drift rates in mechanical gyros, as presently being investigated in the art, is based upon increasing the angular momentum of the rotor, principally by increasing rotor speeds, and by decreasing the rotor and gimbal bearing frictions and unbalances so that the ratio of angular momentum to displacement torques will be as high as possible.

In certain types of mechanical gyro systems it is possible to correct drift over long periods by monitoring the gyro with a magnetic compass, a pendulum, or some other primary direction measuring instrument. The monitoring consists of applying small controlled precession torques to the gyro if it deviates from the primary reference direction for any appreciable time. In this way, short period disturbances such as aircraft roll or acceleration which affect the compass or pendulum do not affect the gyro. Longer period deviations are allowed to affect the gyro on the assumption that the short period disturbances of the primary reference should average to zero while the longer deviations are due to gyro drift. Such a compensation scheme is applicable only in places where this assumption is valid such as in the German V-1 rocket which is supposed to maintain an unaccelerated flight without roll.

The principal use of a highly perfected free gyro is in ground to ground high trajectory missiles which have entirely internal controls. The accuracy of such missiles will depend on the accuracy with which angles and velocities can be measured and controlled and on the degree to which these parameters control the path of the missile.

When used as an indicator of position relationship between a mechanical gyro and the environment on which the mechanical gyro is supported, the small uncontrolled torques tending to displace the gyro axis are made up of a plurality of forces that do not have constant direction or amplitude. Consequently, any gyro of known type has an inherent drift rate, and the direction and amount of this drift cannot be predicted. Relative movements greater than this drift rate will be indicated, but movements less than the drift rate cannot be evaluated, and when indications are made, the drift rate, being wholly anomalous, introduces a basic, always changing error in position measurement.

Thus, the only gyro that can be trusted to register extremely small and/or accurate displacements over long periods is a frictionless gyro, driven by a constant power source, and coupled to its support by frictionless bearings. A mechanical gyro of this type has not yet been attained.

At present, with relatively large rotors and relatively small bearings of the best rolling friction type, a mechanica gyro drift rate of less than 1° per hour is exceptional, and in flight, where bearing forces vary in a completely random manner, a drift rate up to 3° per hour is considered extremely good. Thus, commercial mechanical gyros, such as used in automatic pilots, attitude gyros, directional gyros, and the like for aircraft are required to be constantly monitored or to be reset from a reference source every 10 to 15 minutes, and at best can be no more accurate at any time than the accuracy of the reference source.

The present invention is concerned with a gyro that can be for the first time termed absolutely frictionless.

Among the objects of the present invention are:

(a) To provide a free gyro that will accurately maintain its position in inertial space for many hours without drift;

(b) To provide a free gyro without anomalous drift;

(c) To provide a gyro having no friction in its bearings or supports;

(d) To provide a free gyro that is capable, without monitoring, of providing an accurate positional reference in inertial space;

(e) To provide a gyro in which the ratio of moment of angular momentum to displacement torque is infinite;

(f) To provide an electron gyro;

(g) To provide a simple, accurate and relatively inexpensive gyro;

(h) And to provide a frictionless accelerometer.

The gyro of the present invention depends for its frictionless characteristics on the property known as superconductivity exhibited by certain metals and alloys at extremely low temperatures, and on the fact that electrons have appreciable mass.

The state of zero electrical resistance in many metals and alloys, known as superconductivity, is due to the appearance at very low temperatures of electrons endowed with the remarkable property of being able to travel through certain materials without the slightest trace of electrical friction. Such properties have been extensively investigated at temperatures as low as on the order of 1° K. obtained by boiling liquid helium, for example, in cryostat.

In broad terms as to method, in the present invention a circulating electrical current is induced and maintained in a material held at a superconducting temperature where no trace whatsoever of electrical resistance to the circulation of this current, is present. The electrons in this orbital current possess an angular momentum that is infinitely high as compared to the definitely zero frictional forces acting on the current flow. The flow thus exhibits a high gyroscopic rigidity completely undisturbed by frictional effects such as are always present in mechanical gyros.

In the electron gyro of the present invention, no bearings whatever are involved for the rotor (the current flow) or for gimbals or rotor supports, as the latter are not required. I prefer to form the superconducting material in the shape of a sphere or truncated sphere so that tilt space is provided for the circulating current. I then measure the relative position of the orbital current within the superconducting material, to measure displacement and/or tilt of the latter with respect to the current plane.

As there are no frictional forces available to cause drift of the orbital current plane, the orbital current will at all times maintain the plane in which it was started and thus can be utilized as an absolute reference in inertial space. The electron gyro of the present invention for the first time provides an absolute, not apparent, reference that can be utilized for navigation over any range (within the limits of superconductive temperature time), as deviations from the predetermined position of the electron flow can be relied upon as due to true displacement and not to any anomalous combination of friction variables or torques.

In this manner an extremely accurate reference line or plane can be provided for use in pilotless missiles, for example, over long ranges. The device of the present invention also can act as an extremely sensitive accelerometer.

Broadly as to apparatus, the present invention includes a mass of material capable of superconductivity, and means for maintaining the material superconductive over periods on the order of many hours. An orbital circulating current is circulated in the superconducting material, in a known plane. Means are then provided to sense and measure the relative position of the orbital current within the superconductive material. For navigation purposes, means are provided, actuated by the sense and measurement signals, to measure angles subtended between the electron gyro axis and a reference plane.

One material that has this superconductive property at and below about 15° K. is columbium nitride. As this temperature is some 50% higher on the absolute scale of temperature than any previously known superconductor, it can be made superconducting in the temperature range attainable with liquid hydrogen alone; i. e., without the necessity of using liquid helium. This simplification makes superconductivity available in a relatively light cryostat suitable for aircraft use, one that can be initially charged, for example, with liquid hydrogen and which will maintain a constant temperature of 14° K. for many hours.

At modern aircraft speeds, for example, of 500 M. P. H. such a cryostat can maintain superconductivity temperatures over a range of 25,000 miles and at greater ranges at higher speeds, whereas at present guided missiles are contemplated with ranges in most cases of not greatly over 5,000 miles. The run-down time of a current in a superconducting material having a value of, for example, 200 amperes is not known. Such currents have been known( however, to circulate freely in superconducting materials for 7 to 10 days without measurable change in intensity. It is thus clear that the aircraft type cryostat herein to be described has ample capacity to maintain superconductivity temperatures over any range at present possible for guided missile propulsion.

In a preferred form, the present invention includes a cryostat filled with liquid hydrogen in which a mass of columbium nitride is immersed, this mass having a truncated spherical shape. Means are provided to induce a heavy orbital circulating current in said mass, after the superconductivity state has been reached, in a known plane. Means such as magnetometers are placed with relation to the current flow in the mass to measure any change in position of the orbital current within the mass.

For use as an astrocompass I prefer to mount the cryostat containing the electron gyro on a platform having two degrees of movement with respect to a reference plane, this platform being roughly stabilized by an unmonitored conventional gyro having as low a drift rate as possible (on the order of .5°–1.0° per hour in flight). The gross angles with respect to the reference plane are taken from the platform which reflects only the mechanical gyro position. Means are then provided to utilize the magnetometer output from the electron gyro to correct the gross angle reported by the platform, to obtain the true angle with respect to the reference plane.

Alternatively, the output of the eletcronic gyro can be used to maintain the mechanical gyro in a fixed position. In this case the electron gyro is used to monitor the mechanical gyro.

In either case, means are provided indicating the relative position of the electron gyro and other reference devices such as, for example, a natural or artificial horizon. As the magnetometer output then at all times reflects the predetermined and known position of the electron gyro, accurate star sighting or inertial space positioning can be accomplished without the necessity of ever seeing or optically viewing the star or other point in space.

When in use as a navigation instrument the effect of the earth's field is preferably eliminated by a magnetic shield placed entirely around the cryostat.

My invention will be more fully understood by reference to the accompanying drawings which show an electron gyro of the present invention as applied to the accurate and continuous determination of a sight line, such as a star position, with respect to a reference plane which may be, for example, the natural horizon, or any form of artificial horizon or its equivalent.

In the drawings:

Figure 1 is a vertical sectional view, partly in elevation, of a cryostat containing a preferred embodiment of the present invention.

Figure 2 is an enlarged sectional view of a portion of the gyro ring and a magnetometer as used in the device of Figure 1.

Figure 3 is a top plan view of a gyro ring and associated magnetometers.

Figure 4 is a perspective view of the cryostat of Figure 1 as mounted on a platform stabilized by an unmonitored mechanical gyro.

Figure 5 is a diagram of one way of obtaining true star position with respect to a reference plane using the device of Figure 4.

A preferred cryostat utilized to obtain superconductivity in the practice of the present invention in one preferred form is a modification of a cryostat developed for the U. S. Navy at Johns Hopkins University, Baltimore, Maryland, in 1947. This modified cryostat is shown in Figure 1, which will next be referred to.

The outside case of the cryostat C is a cylindrical shell 10 of Monel metal, 2½' high, and about 20" in diameter. This case provides the outer wall of a vacuum chamber 11 serving as thermal insulation for the elements inside, and also forms the principal mechanical support on which the other elements of the cryostat are suspended.

Within and concentric with the outside case there is a radiation shield 12 of polished aluminum. This shield is held in position by two thick annular "Masonite" rings 14, ⅛" thick, one press-fitted into each end of the shell 10. Inserted in the "Masonite" rings 14 are small pins 15 which project to prevent the shield 12 from shifting transverse to the principle axis. The "Masonite" rings 14 insure thermal insulation between the outer case and the shield 12.

In order further to decrease the heat leak by conduction, the rings 14 have slots 16 cut in them, arranged in such a manner as to provide a long path for any heat flowing through, while at the same time retaining structural strength.

Extending through and fitting snugly inside the rings 14 there is a copper cylinder 17 which forms the inner wall of a liquid nitrogen vessel 19.

Around the outside of the central and lower portion of the copper cylinder 17 there is mounted an outer vessel wall 20 of copper, the ends of which are turned inwardly and sealed to copper cylinder 17, thus forming the vessel 19 for holding the liquid nitrogen, with a capacity of about 14 liters.

A container 21 for liquid hydrogen is formed from Monel metal and is located inside the copper cylinder 17 which forms the inner wall of the liquid nitrogen vessel 19 but is spaced therefrom. The top 22 of the container 21 is held in place by an insulating disc 24 of "Masonite," extended inwardly from copper cylinder 17. A second "Masonite" disc 25 holds the bottom 26 of the hydrogen container 21 in position by a press-fit of the second disc 25 into the copper cylinder 17 of the nitrogen vessel 19. The type of slotting arrangement used in the "Masonite" discs 24 and 25 is the same as that used in the "Masonite" annular rings 14.

Inside the hydrogen container 21 near the bottom thereof there is located a gyro assembly 27.

This gyro assembly comprises a copper spider 30, having arms 31 extended outwardly from a central support 32 attached to the bottom 26 of the hydrogen container 21, as shown in Figures 2 and 3. The outer ends of arms 31 carry a columbium nitride gyro ring 29 about 6" in diameter made of nitrided columbium sheet ¼" thick and shaped to be an equatorial sector of a hollow sphere. The sector is about 2" high and extends about 10° each side of the equatorial plane, although greater angles can be used if desired. The gyro ring can be mounted on copper, as the copper is not superconductive at 14° K, and, therefore, has a high resistance as compared to the zero gyro ring resistance when superconductive.

The gyro ring 29 can be formed, for example, from columbium sheet, presently available with an impurity specification of less than one percent. One method of preparing the formed ring is to first wash it with carbon tetrachloride to remove any grease. A stream of ammonia, after passing through a mercury bubbler and a calcium chloride dryer, enters through the top of a tube to be used for nitriding the ring. The gas passes out of the bottom of the tube and goes through a calcium chloride dryer, a safety trap, and is finally bubbled into water. When the air has been completely flushed away from the interior of the tube, a current is induced in the ring sufficient to raise the temperature therein to the desired level, 1200°–1400° C., which is maintained for about 45 minutes or more. This gives a nitrided ring with the desired properties.

Positioned diametrically opposite at the outer periphery of gyro ring 29 are two pairs of magnetometer casings 34. Each magnetometer casing is spaced 90°.

Magnetometer casings 34 in the hydrogen container are each provided with a metal tube 35 sealed thereto, and these tubes 35 are connected together and extended upwardly as a single tube 35a, the latter being sealed to the top 22 of the hydrogen container 21. A cable 36 carrying the magnetometer connections then emerges from the tube 35a above the hydrogen container 21. Thus, magnetometers (later described) used inside casings 34 are not in actual contact with the liquid hydrogen, but are at liquid hydrogen temperatures.

Also within the hydrogen container 21 is positioned a coil 40 of heavy copper located in the best position to induce a current in gyro ring 29, and leads 41 therefrom are sealed to top 22 of the hydrogen container 21 by insulating seals 39.

The liquid hydrogen container 21 is filled through a hydrogen filler tube 42 coiled above "Masonite" disc 24. Filler tube 42 is made of supernickel, with an outside diameter of about ⅜₁₆". This tube is sealed through top 22 and extends to the bottom of container 21. There is also a parallel coiled hydrogen gas vent tube 44 also made of supernickel having an outside diameter of ¼" also sealed to top 22. This vent tube 44 also provides a convenient means of pumping down the liquid hydrogen to the triple point temperature, as will be described later.

The upper end of the copper cylinder 17 is then closed by a copper cap 45 through which hydrogen filler tube 42, vent pipe 44 and leads 41 pass, as does the magnetometer cable 36. These passages, however, are not sealed. As cap 45 is held close to liquid nitrogen temperature, it acts as a top thermal shield.

The nitrogen vessel 19 is filled through a coiled nitrogen filler tube 46 extending to the bottom of nitrogen vessel 19 and also has a nitrogen coiled gas vent tube 47. Both tubes 46 and 47 extend upwardly to terminate outside the cryostat.

The nitrogen vessel 19 also contains two inset tubular traps 50 filled with activated charcoal, each tube being in connection with the vacuum chamber 11.

The region around the bottom 26 of the hydrogen container 21 is protected by a thermal shield 49 formed as an extension of the copper cylinder 17 that is the inner wall of the liquid nitrogen vessel. At the liquid nitrogen temperature the shield gives off negligible radiation to any object inside of it, while at the same time it cuts off and absorbs radiated heat or conducted heat from the outside. Outside this shield there is a continuation of the vacuum chamber 11. Thus, the thermal shielding of the bottom of the hydrogen container is similar to that obtained at the top thereof where the upper portion of copper cylinder 17 and cap 45 act in the same manner as the thermal shield 49.

The outer Monel shell 10 is then closed and sealed by an upper Monel cap 49a through which the leads 41, the hydrogen filler tube 42 and hydrogen vent pipe 44 pass, as well as the nitrogen filler tube 46 and nitrogen vent tube 47 also pass, the tubes being sealed to cap 49a as by welding, for example, and the leads 41 being insulated by ceramic seals. Magnetometer cable 36 is connected to a hermetic connection receptacle 51, the outside prongs of which serve to make connections to the magnetometers in casings 34. The Monel cap 49a is also provided with a vacuum connection 52 by which the open spaces of the cryostat can be evacuated.

These vacuum spaces, in the construction above described, exist completely around the nitrogen vessel 19 and also completely around the hydrogen container 21.

In the use of the device, a preliminary pumping is made of the vacuum spaces in the cryostat by means of a vacuum pump (not shown) attached to vacuum connection 52. In practice this preliminary pumping is used to reduce the pressure to slightly below one-tenth of a millimeter of mercury. The vacuum connection is then sealed off by a vacuum valve 54.

The liquid nitrogen vessel 19 is then filled through nitrogen filler tube 46 and the nitrogen vent tube 47 is left open so that the nitrogen will remain at its boiling point at one atmosphere, i. e., 77.4° K. If and when the cryostat is to be used at high altitudes, known means can be utilized to maintain the constant desired pressure of one atmosphere on the liquid nitrogen.

The liquid hydrogen is then introduced through the liquid hydrogen filler tube 42 and the filler tube is capped.

A small vacuum pump P (indicated in Figure 1 by dotted lines) is then attached to the hydrogen vent pipe 44, and the hydrogen is boiled under reduced pressure until the triple state is reached with the hydrogen partly liquid and partly solid at a temperature of 14° K. This state is maintained by proper pressure regulation at the vacuum pump.

In subsequent operation, the charcoal traps 50 absorb the greater part of any residual air in the vacuum spaces, and the rest is frozen out on the liquid hydrogen container, so that an excellent vacuum is maintained at all times around the hydrogen and nitrogen containers.

At about 14.5° K. the gyro ring 29 of columbium nitride becomes superconductive.

Coil 40 is energized from a D. C. generator G shown in dotted lines, prior to the gyro ring reaching the superconductive state. Heating of the coil is negligible due to the large corss-section thereof. The magnetic field of coil 40 is terminated after the super-conductive state has been reached by sharply breaking the current passing therethrough. A persistent, frictionless and orbital circulating current then flows in the superconductive gyro ring 29 as long as the ring is maintained in its state of superconductivity and is not influenced by an external magnetic field. For this latter reason, a magnetic shield 60 is placed around the entire cryostat to shield the circulating current from the earth's field, this magnetic shield mating with a base 61 also of magnetic material enclosing heat insulating material 62 on which the cryostat is supported.

A current in the gyro ring of about 200 amperes is preferred. This current will be equatorial, due to the centrifugal force of the electron flow.

The cryostat above described will maintain the hydrogen at the triple point for many hours with the gyro ring in a superconducting state. Approximately 20 liters of liquid hydrogen are required for this purpose, together with about 14 liters of liquid nitrogen. Units of the type described have been subjected to severe mechanical strain, have stood up well under rugged treatment in the field and are thus ideally suitable for installation in aircraft.

Changes in the relative position plane of the orbital current within the gyro ring 29 with respect to the gyro ring position are sensed by two sets of magnetometers $65x$ positioned within casings 34 adjacent the ring. One type of magnetometer found satisfactory to sense the change in position of the orbital current in the superconductive ring is shown in Figure 2.

A U-shaped pole piece 70 is provided with carefully balanced windings 71, one on each leg 72 of the pole piece. These windings 71 are connected in series and form the output leads 74 of the magnetometer. A central core 75 is provided, terminating between the ends of the pole piece legs 72 and has a pointed end closely approaching the columbium nitride ring 29. An energizing coil 76 is wound on core 75. In operation coil 76 is supplied by A. C. from an external source through energizing leads 77. Leads 74 and 77 pass through tubes 35 and 35a to form cable 36.

When coil 76 is energized by the A. C. and with the magnetometer $65x$ in the null position no current flows in output leads 74. However, a small deviation of the current plane in the superconductive gyro ring 29 causes a detectible difference in the flux densities in the two legs of the pole piece 70 and, therefore, in the windings 71. Thus, an output current is provided when the orbital current plane shifts. The action of the magnetometers above described is substantially similar to the action of the flux valves or gates used in earth inductor compass systems.

The magnetometers, positioned on the periphery of the gyro ring 29 at 90° spacing will sense any motion of the ring with respect to the current plane, which remains fixed in space during motion of the gyro ring, within the limits of the extent of the superconductive material provided.

The circulating current has a definite and calculable moment of momentum which, for a 200 ampere current, is about $6 \times 10^{-5}$ gm./cm./sec. In consequence, a well defined gyrostatic action is present, and as the resistance to the current flow in any plane is unequivocally zero, the device described thus is a perfect free gyro having means for indicating any relative movement between the gyro ring and the current plane.

It is preferred to utilize two magnetometers $65x$ diametrically spaced on the X tilt axis and two magnetometers $65y$ on the Y axis. The output of the two magnetometers on the same axis are then connected in series so that any slight movement of the orbital current plane axially with respect to the plane of the gyro ring will produce output currents in the two magnetometers that will cancel, whereas outputs that are due to tilt will add, thereby preventing false output signals due to any possible axial accelerations imparted to the gyro ring in flight. As will be pointed out later, accelerations can also be measured if desired.

It is also interesting to note here that the pickup of the magnetometers has not been found to affect the position of the circulating current in the gyro ring nor does this pickup appear to abstract power from the circulating current. The energy picked up by the magnetometers is believed to come solely from the external work applied to move the gyro ring relative to the plane of the circulating current, and thus does not come from the circulating current itself. As the magnetometers are A. C. operated, the sense of the tilt is determined by the phase relation of the output to the A. C. energization.

It is also to be noted that the two sets of magnetometers $65x$ and $65y$ can be relatively small, as they are highly efficient at 14° K. This is due to the fact that the permeability of the magnetic material in the magnetometers increases with decrease in temperature, and for that reason I prefer to mount the magnetometers within the hydrogen container. Furthermore, such mounting permits the magnetometer pole pieces 70 to closely approach the periphery of the gyro ring 29.

While the electron gyro so far described can be used for any purpose where a true free gyro is called for, it will be further described herein as mounted for operation as an astrocompass.

The gross aspects of a preferred system utilizing the electron gyro of the present invention to indicate the true angles of a star, for example, or other position in inertial space, with respect to a reference plane, is shown in Figure 4.

Here, a stabilized platform 100 is mounted to rotate in a platform gimbal ring 101, this latter platform gimbal ring being rotatable at a right angle to the rotational axis of primary platform 100, on an outer yoke 102 which is fixed to a device having a reference plane R so that the platform 100 can rotate about X and Y axes, respectively, with respect to the reference plane R.

Positioned on the bottom of platform 100 is a mechanical gyro 105 mounted to have X axis and Y axis freedom in an inner gyro yoke 106 and an outer gyro bearing 107. This mechanical gyro is of the precision type, electrically driven and provided with electrical X axis and Y axis angle pickups 109 and 110, respectively, as is customary for gyro horizon controls for aircraft.

Also on the platform 100 is mounted a small electrically driven vacuum pump 111.

Over the platform 100 is positioned the cryostat C, previously described, in which the superconductive gyro ring 29 is mounted, having the two sets of magnetometers 65x associated therewith positioned to indicate respective displacements around the X axis and Y axis of the ring with respect to the stationary current plane inside the gyro ring.

All connections to mechanical gyro pickups 109 and 110 and to the mechanical gyro rotor 105, vacuum pump driving motor 113, and vacuum pump 111 are brought out through cable 112 and transfer pigtails 112a mounted between the platform 100 and platform gimbal ring 101 and through output pigtails 114 mounted between platform gimbal ring 101 and yoke 102 to enter a main cable 115. A plug and cable assembly 51a connects the magnetometers with pigtails 112a and 114.

Cable leads 109a and 110a from the mechanical gyro pickups 109 and 110, respectively, after emerging from main cable 115 are led through X axis and Y axis servo amplifiers 116 and 117, respectively. The outputs of these latter amplifiers are connected to energize X axis and Y axis servo motors 119 and 120, respectively, mounted to turn the respective platform axles so that the platform 100 is slaved to the mechanical gyro 105, as is well known in the art. Associated with the servos 119 and 120, respectively, are X axis and Y axis gross angle signal transmitters 119a and 120a.

The mechanical gyro 105 is constructed to have a drift rate of preferably not greater than 0.5°–1.0° per hour in flight, and is completely unmonitored so that the maximum drift, for example, in a hour use, for example, will be only a few degrees. Mechanical gyro 105 is preferably caged and brought up to speed at the start of the run of the device with its rotor axis in some predetermined known relation to the reference plane.

The axis of the mechanical gyro is also preferably positioned initially to be in line with the axis of the electron gyro so that the magnetometers are in a null position with respect to the rotating current in the gyro ring. If the reference plane R is, for example, the plane of the natural horizon, or an artificial horizon or its equivalent, the axes of the two gyros can, for example, be pointed to a star whose timely position with respect to the earth's horizon is known (or to any other point in inertial space), and the axis of the electron gyro will continue to point at the same point irrespective of the drift of the reference platform.

Due to its inherent drift, the axis of the mechanical gyro, and the axis of the platform originally pointed at the known point in inertial space, will not, after passage of time, still point to the original space point. The axis of the electron gyro will, however, still point in the exact original direction in space. Thus, the position of the mechanical gyro and the platform slaved to it as corrected by the position of the circulating current in the gyro ring of the electron gyro, will give the true direction to the original point in inertial space.

Thus, as shown in Figure 5, the gross angle of the platform with respect to the reference plane as represented by signals generated by X axis angle signal transmitter 119a is fed to X axis angle signal correcting amplifier 130 through the X axis gross angle signal output 131. The output 132 from the X axis magnetometers 65x is also led to the X axis angle signal correcting amplifier 130 and the combined output indicated by true X axis angle indicator 133.

In the same manner the gross angle of the platform as represented by signals generated by Y axis angle signal transmitter 120a is fed to a Y axis angle signal correcting amplifier 134 through the Y axis gross angle signal output 135. The output 136 from the Y axis magnetometers 65y is also led to the Y axis angle correcting amplifier 134 and the true Y axis angle is indicated by true Y axis angle indicator 137.

Thus, the coordinate angles of any point in inertial space can be obtained with respect to any desired reference plane. Such an astrocompass which will at all times indicate the exact position of a point in inertial space is, of course, completely independent of weather conditions, and eliminates any necessity of star tracking by optical means, with its associated limitations and errors.

The time limitation of the electron gyro of the present invention, as described herein, is not due to rundown time, drift or the ability to maintain superconductive temperatures but is due primarily to the change of angle of the cryostat with respect to the center of gravity of the earth. The cryostat should, of course, always be operated at an angle where the gyro ring is completely immersed in the coolant. Tilting of the cryostat tends to uncover the ring when too great an angle with the natural horizon plane is reached. However, by proper choice of stars in the polar regions, such tilting is minimized.

Furthermore, the useful tilt angle can be doubled by starting the cryostat in a tilted position, with the gyro ring tilted within the cryostat so that the tilt angle of the cryostat decreases with time until the level position of the cryostat is reached. The angle can then again be increased until a final critical angle is reached. By properly arranging the depth of liquid hydrogen and the angular relation of the gyro ring within the cryostat a maximum operative angle of 50° to 60° can be obtained in the present device, which corresponds to travel of a point on the earth's surface at the equator with respect to an equatorial point in inertial space of slightly over 3,000 to 4,000 miles. However, using more polar points in inertial space and operating well into the north or south latitudes, distances up to 10,000 miles or more can readily be covered without reaching a critical tilt angle of the cryostat.

A number of interesting and novel points regarding the electron gyro of the present invention, as above described, will be next discussed.

When the gyro ring is shaped as an equatorial sector of a sphere, the circulating current, due to its centrifugal force, will normally be in an equatorial plane, and closer to the outside of the ring than to the inside. For this reason I prefer to place the magnetometers outside of the ring. However, only a slightly less sensitivity is obtained by inside positioning and in some instances such inside positioning may be desirable to reduce the size and weight of the cryostat.

It also follows that as the rotating electron flow possesses a substantial mass, the rotating electron flow can also be utilized as an accelerometer, as mentioned briefly above, in discussing magnetometer connections to eliminate acceleration effect. If desired, however, the entire device may be utilized as an accelerometer by proper magnetometer connections that will be apparent to those skilled in the art. When used as an accelerometer, the current, when displaced by an acceleration, no longer flows in an equatorial plane. This displacement is readily measured, and the restoring force is the centrifugal force of the rotating electrons which returns the current plane to the equatorial plane of the gyro ring after the acceleration has ceased. It will also be apparent to those skilled in the art that by proper magnetometer arrangement and connections, the electron gyro of the present invention can simultaneously measure both acceleration and tilt if desired. When the electron gyro of the present invention is to be used as an accelerometer alone, the gyro ring need not be a spherical sector but may, for example, be shaped as two truncated cones with their basal sections joined. The conical angles can then be changed to change the restoring force as desired. If acceleration in one sense only is desired, only one cone need be used. Furthermore, the gyro ring can also be formed as a complete sphere or any part thereof as desired, with pickups placed to sense their position and/or movement of the orbital current within the sphere as desired. Other configurations of the gyro ring for specific purposes will be apparent to those skilled in the art from a perusal of this specification, and I do not desire to be limited to any particular ring contours.

While the present invention has also been described herein as preferably utilizing the superconducting characteristics of columbium nitride at 14° K. as obtained by the use of evaporating liquid hydrogen, it is to be distinctly understood that many other electrical conductors become superconducting at still lower temperatures, such as temperatures that can be obtained by the use of evaporating liquid helium as a coolant. Such other superconducting materials are fully as suitable for use to produce the free gyro of the present invention as is the columbium nitride gyro ring described herein. However, columbium nitride is more suitable for use in portable and transportable gyros, due to the higher temperature operation, and is preferred for such use. As the action of the device of the present invention is identical in any superconducting medium whatever the temperature required to produce the superconducting state, I do not desire to be limited to the use of columbium nitride or to the use of liquid hydrogen in the practice of my invention, as other superconducting materials are full equivalents, irrespective of the temperature at which superconductivity takes place.

Furthermore, I do not desire to be limited in any way to the particular manner herein described of forming the columbium nitride circuit, or to the particular nitriding process herein described as illustrative. Any form of circuit can be used that will provide an orbital current path with provision for current plane shift. Published data is available on the fashioning of columbium bodies by the use of powder metallurgy and plating, together with satisfactory methods of nitriding such bodies. When lower temperatures are utilized, easily worked metals are available for the formation of the superconductive circuit without additional treatment.

From the above description and discussion it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the patent statutes, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its possible forms or modifications within the legitimate and valid scope of the appended claims.

What is claimed is:

1. A device for stabilizing an accurate reference in space with respect to a reference plane comprising an element mounted to have two degrees of freedom with respect to said plane, a mechanical gyro mounted on said element to have the same degree of freedom, means for slaving said element to said mechanical gyro, a circular conductor mounted on said element, means for maintaining a frictionless current in said conductor, means for generating signals representing tilt in two co-ordinates between said current flow and said conductor, and means for indicating the angular relation of said element to said reference plane.

2. In a vehicle, a platform mounted to have at least one degree of freedom therewith, a mechanical gyro carried by said platform and having the same degree of freedom, means for slaving said platform to said mechanical gyro, a cryostat carried by said platform, a circular conductor mounted in said cryostat, means for maintaining a frictionless current flow in said conductor at a superconductive temperature, and means positioned to generate signals representing tilt of said platform with respect to the plane of current flow in said conductor in a plane of freedom of said platform.

3. In combination, a platform mounted on a reference plane to have at least one degree of freedom therewith, a mechanical gyro carried by said platform and having the same degree of freedom, means for slaving said platform to said mechanical gyro, a cryostat carried by said platform, a circular conductor mounted in said cryostat, means for maintaining a frictionless current flow in said conductor at a superconductive temperature, and means positioned to generate signals representing tilt of said platform with respect to the plane of current flow in said conductor, and means for measuring the angular relationship of said platform with respect to said reference plane.

4. Position determining means comprising a container, a mass of columbium nitride capable of becoming superconductive below a predetermined temperature, said mass having an exterior surface shaped as an equatorial portion of a sphere and positioned inside of said container, said container being adapted to hold liquid hydrogen which, when evaporated can reach a temperature at which said mass is superconductive, means for controlling the pressure within said container to hold said liquid hydrogen at its triple point at about 14° K. to control said evaporation, means for heat insulating said container from the atmosphere, said heat insulation means having means for holding a mass of liquid nitrogen and means cooperating with said mass of columbium nitride for sensing the field of a current flowing in said mass.

5. Position determining means comprising a container, a mass of material capable of becoming superconductive below a predetermined temperature, said mass having an exterior surface shaped as an equatorial portion of a sphere and positioned inside of said container, said container being adapted to hold a liquefied gas which, when evaporated can reach a temperature at which said mass is superconductive, means for controlling the pressure within said container to control said evaporation, means for heat insulating said container from the atmosphere, and magnetometers spaced at each 90° interval around the periphery of said mass, opposite magnetometers being connected in series for output cancellation due to axial movement of the current in said mass.

References Cited in the file of this patent

UNITED STATES PATENTS

| | | |
|---|---|---|
| 1,841,606 | Kollsman | Jan. 19, 1932 |
| 1,890,831 | Smith | Dec. 13, 1932 |
| 2,377,212 | Cottrell | May 29, 1945 |

FOREIGN PATENTS

| | | |
|---|---|---|
| 21,671 | Great Britain | Sept. 11, 1911 |

OTHER REFERENCES

Gen. Elec. Rev., pages 19 to 25, June 1946.